United States Patent [19]
Black

[11] 3,822,526
[45] July 9, 1974

[54] TIRE COMPRESSING AND HANDLING APPARATUS

[76] Inventor: Billy B. Black, 3343 N.W. Brickyard Rd., Topeka, Kans. 66618

[22] Filed: May 14, 1973

[21] Appl. No.: 359,703

[52] U.S. Cl. ............... 53/124 D, 100/218, 100/295
[51] Int. Cl. .................................... B65b 63/02
[58] Field of Search ........ 53/124 D, 124 R; 100/218

[56] References Cited
UNITED STATES PATENTS

| | | | |
|---|---|---|---|
| 3,541,948 | 11/1970 | Sauer et al. | 100/218 X |
| 3,766,706 | 10/1973 | Graham | 53/124 D |

*Primary Examiner*—Travis S. McGehee
*Attorney, Agent, or Firm*—Fishburn, Gold & Litman

[57] ABSTRACT

An apparatus for preparing pneumatic tires for shipping and storage including compressing and handling a plurality of tires by positioning same in a group in side-by-side relation and substantially coaxially aligned, compressing the group, moving the compressed group to a shipping structure, positioning the group in said shipping structure which handles one or more groups of compressed tires and maintains the compressed condition until selectively released. The apparatus includes a support structure having at least a pair of laterally spaced, longitudinally extending rails mounted thereon and adapted to receive and support the plurality or selected group of tires between a pair of facing jaws or platens which are movable toward each other to compress a plurality of tires therebetween. Spaced finger groups of a hand assembly engage ends of the compressed tire group and the jaws move away to spread and release the tires which are held by the finger groups. The hand is mounted for movement laterally toward and away from the path of the jaws thereby being adapted to receive and remove the compressed tires from the support structure. The hand is also mounted for movement to a position adjacent a shipping structure on pallet having tire compression maintenance structure. The hand assembly has an ejection member therein which is movable between a retracted position within the hand assembly permitting the hand assembly to receive therein a plurality of compressed tires and an ejection position during movement of the tires out of the hand assembly and into a selected position in a pallet while in a compressed condition.

14 Claims, 11 Drawing Figures

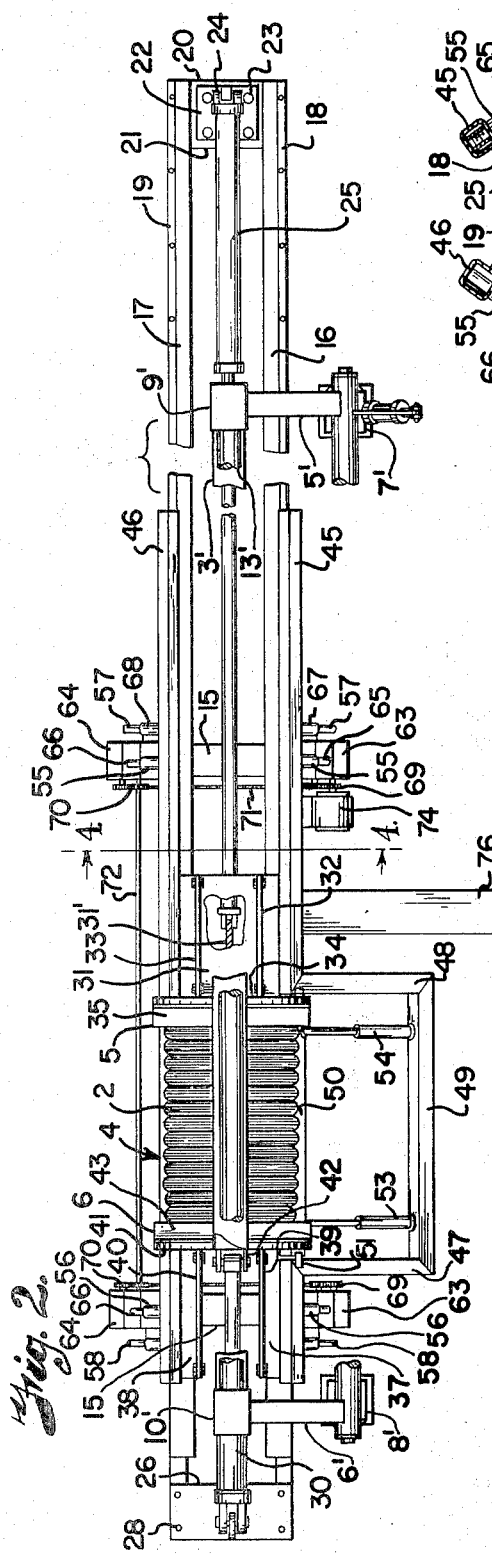
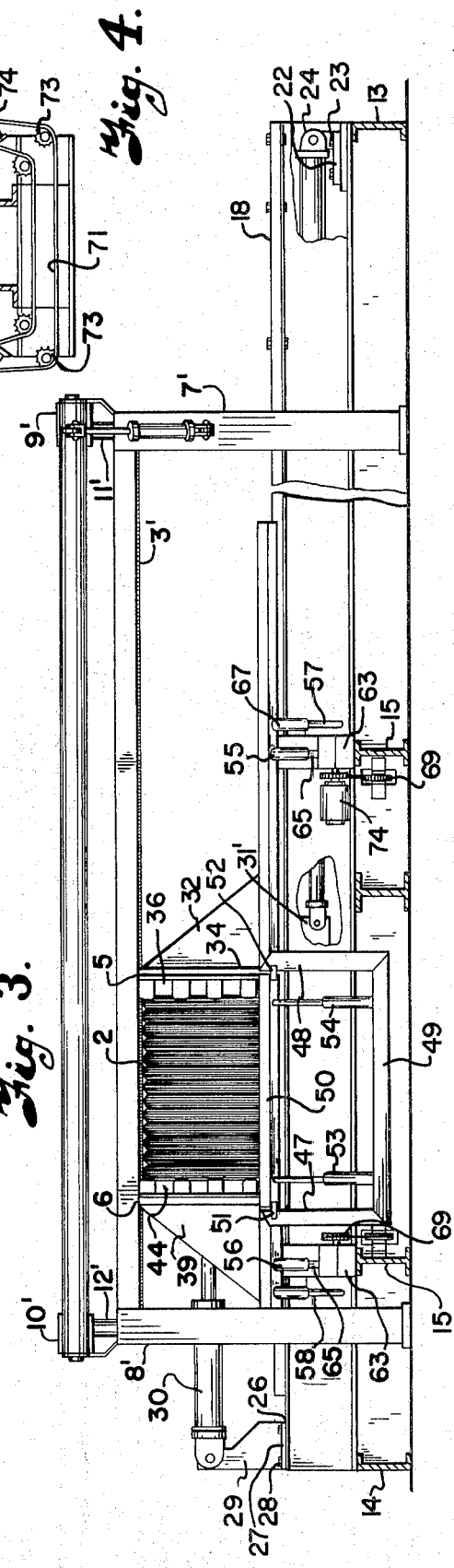
Fig. 2.
Fig. 3.
Fig. 4.

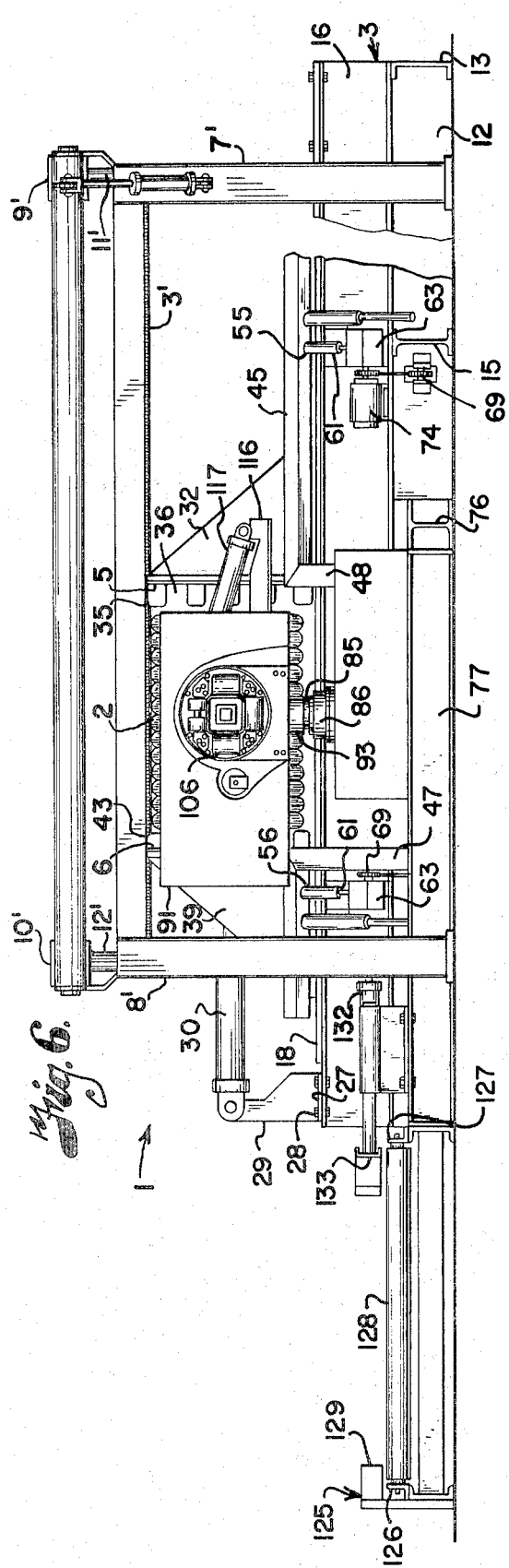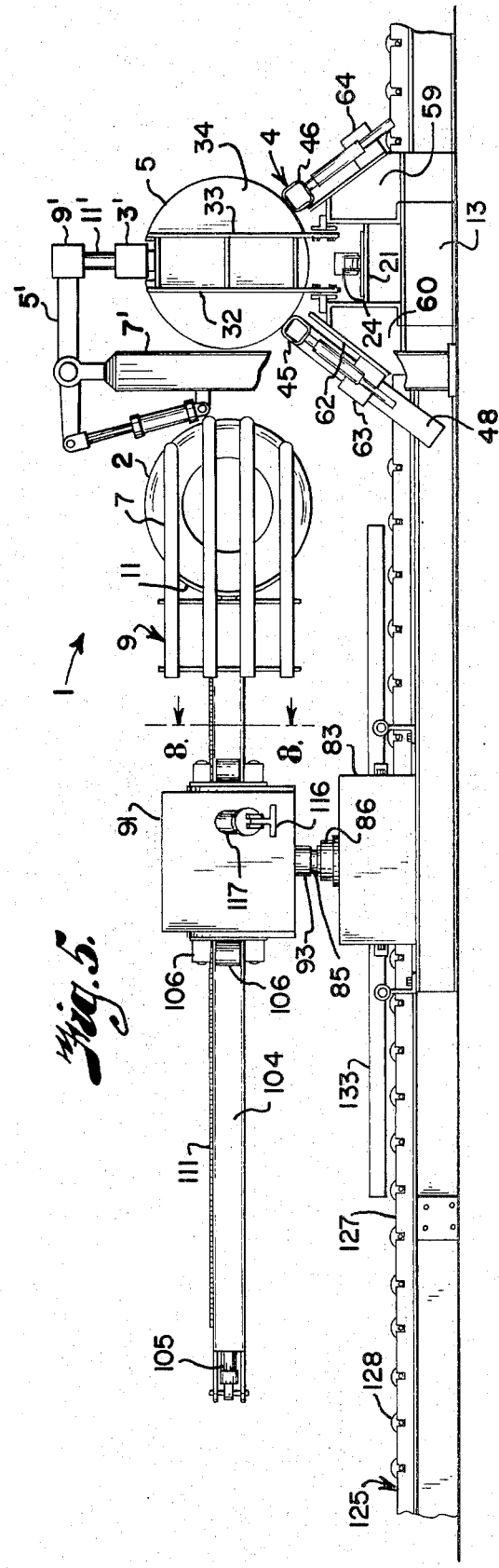

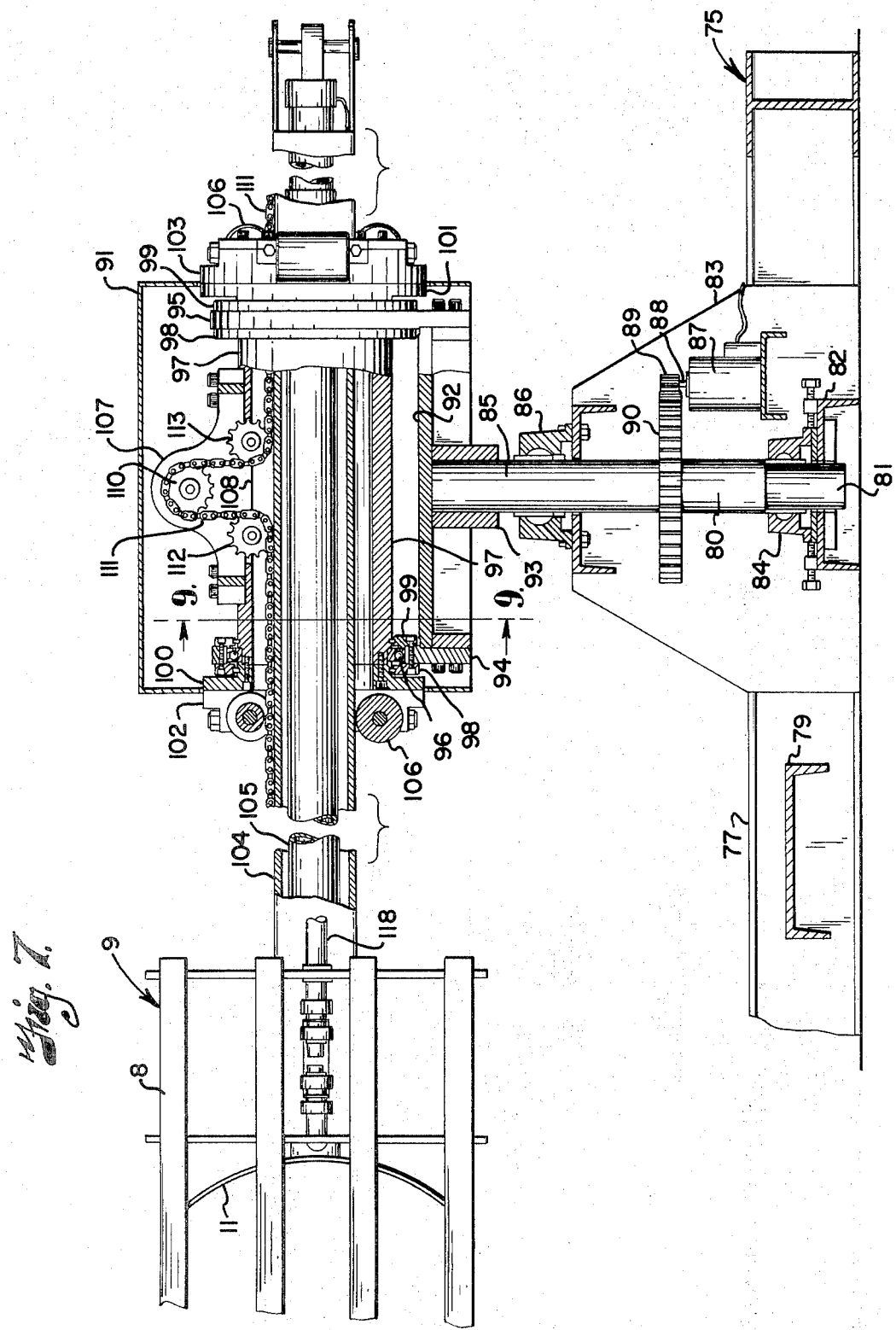

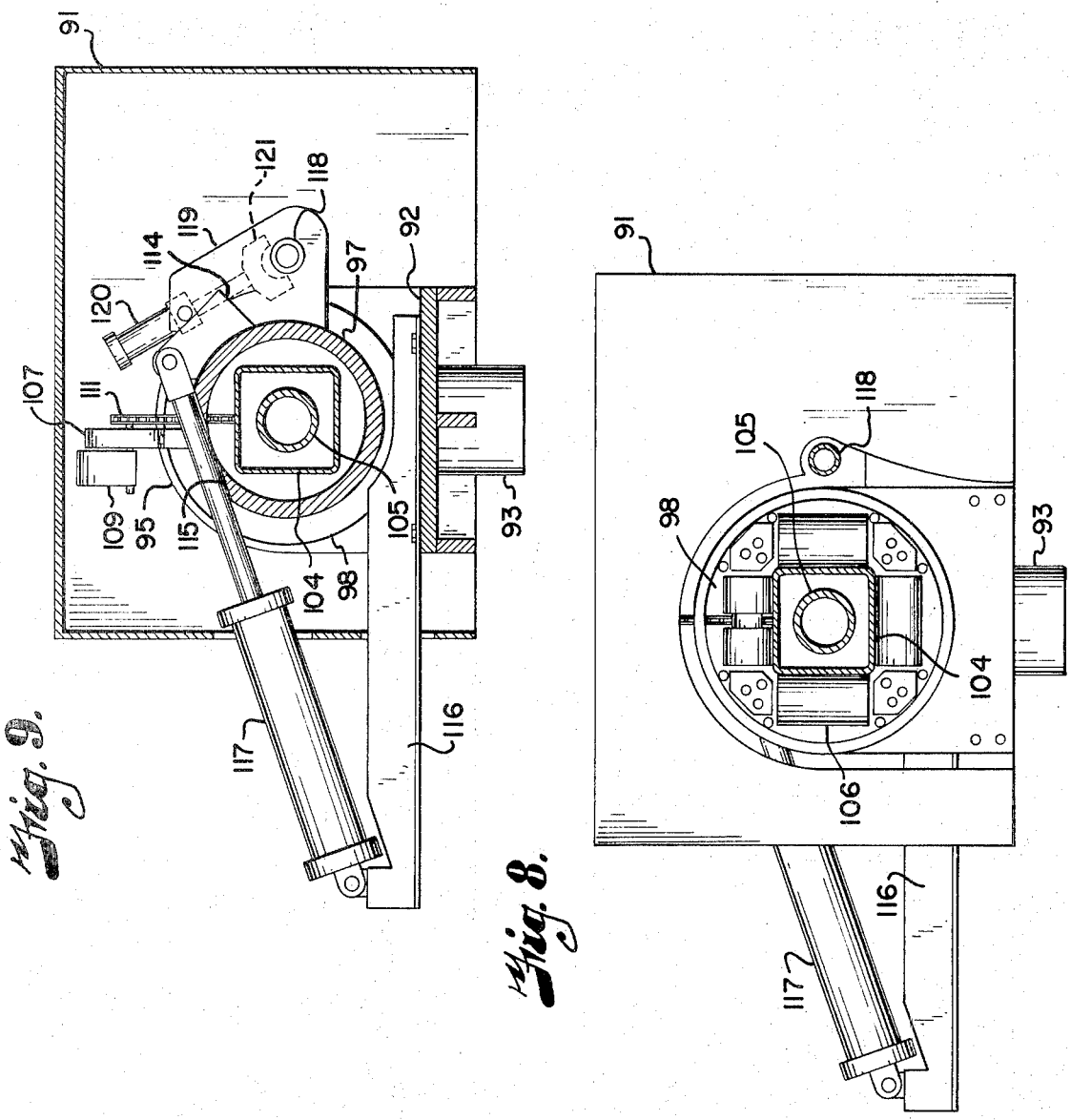

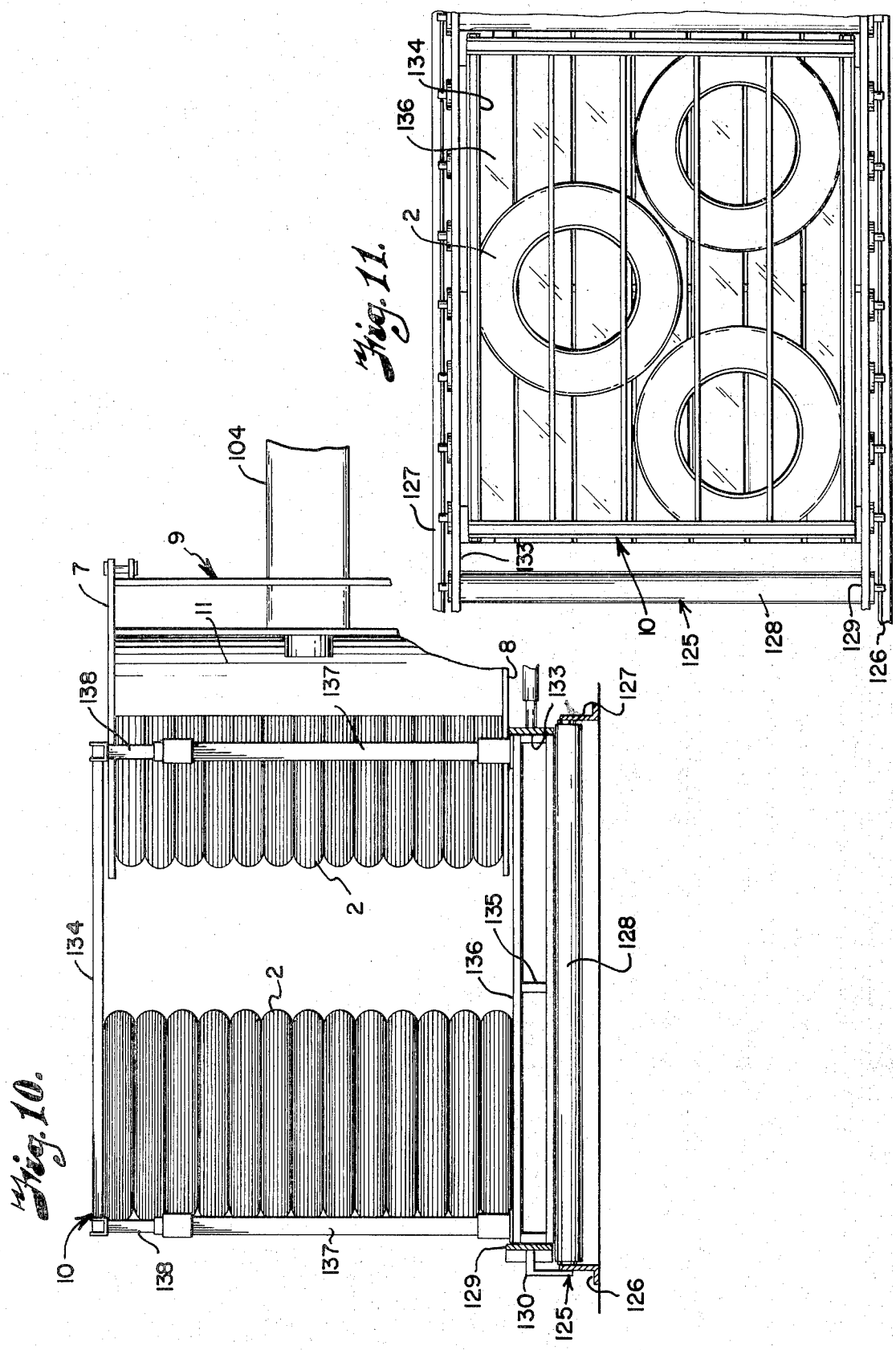

TIRE COMPRESSING AND HANDLING APPARATUS

The present invention relates to apparatus for preparing pneumatic tires for shipping and storage and more particularly to an apparatus for compressing and handling a plurality of tires positioned in substantially coaxial alignment and for placing the tires in a shipping and storage structure while in a compressed condition.

Vehicle tires, such as automobile tires, are preferably handled in large quantities both in shipping and storing in warehouses. Therefore, to facilitate handling, the tires are mounted on pallets which are adapted to be moved by fork-lifts or the like. It has been found that tires can be compressed to take up substantially less space in shipping and storage. Tires have been compressed and strapped in group. They have been stacked on pallets and secured in various manners. All of these methods are time consumming and present handling difficulties. Prior tire compressing apparatus have compressed the tires, but the handling of quantities of tires and supporting same while in a compressed condition presented difficulties.

The principal objects of the present invention are: to provide an apparatus for preparing tires for shipping and storage including compressing a plurality of tires and position-same in pallets while in a compressed condition and which overcomes the difficulties of prior tire handling apparatus; to provide such an apparatus which compresses a selected number of tires in a group, moves the compressed group, and places same in a shipping and storage structure in a compressed condition and all without banding or other tying; to provide such an apparatus adapted to compress and place a plurality of tires in a minimum space while in a compressed condition all without damage to the tires to be stored; to provide such an apparatus adapted to compress a plurality of tires and move same into a pallet where compression is maintained in one substantially continuous operation; to provide such an apparatus which easily, quickly, and economically compresses a plurality of tires and positions same in a holder having a tire supporting pallet; and to provide such a tire compressing and handling apparatus which is positive in operation, durable in construction, and particularly well adapted for the proposed use.

Other objects and advantages of this invention will become apparent from the following description taken in connection with the accompanying drawings wherein are set forth by way of illustration and example certain embodiments of this invention.

The drawings constitute a part of this specification and include an exemplary embodiment of the present invention and illustrate various objects and features of the tire compressing and handling apparatus.

FIG. 2 is an enlarged plan view of a structure for receiving and compressing the plurality of tires.

FIG. 3 is an enlarged side elevational view of the structure for receiving and compressing the plurality of tires.

FIG. 4 is an enlarged transverse sectional view taken on line 4—4, FIG. 2 and showing rail adjusting means.

FIG. 5 is a further enlarged side elevational view of hand assembly for holding and moving compressed tires.

FIG. 6 is also a further enlarged and elevational view of an upstanding support for the hand assembly FIG. 7 is a side elevational view of the hand assembly and support therefor and shown at a scale larger than FIGS. 5 and 6 and portions broken away to show operating parts thereof.

FIG. 8 is a transverse sectional view taken on line 8—8, FIG. 5 and shown at a scale larger than FIG. 7.

FIG. 9 is a transverse sectional view taken on line 9—9, FIG. 7 and show at the same scale as FIG. 8.

FIG. 10 is a fragmentary side elevational view of the hand assembly shown at the same scale as FIGS. 8 and 9 and showing the hand assembly in position to place the tires in a pallet while the tires are in a compressed condition.

FIG. 11 is a top plan view of the pallet showing a plurality of stacks of compressed tires therein.

Figure 1:
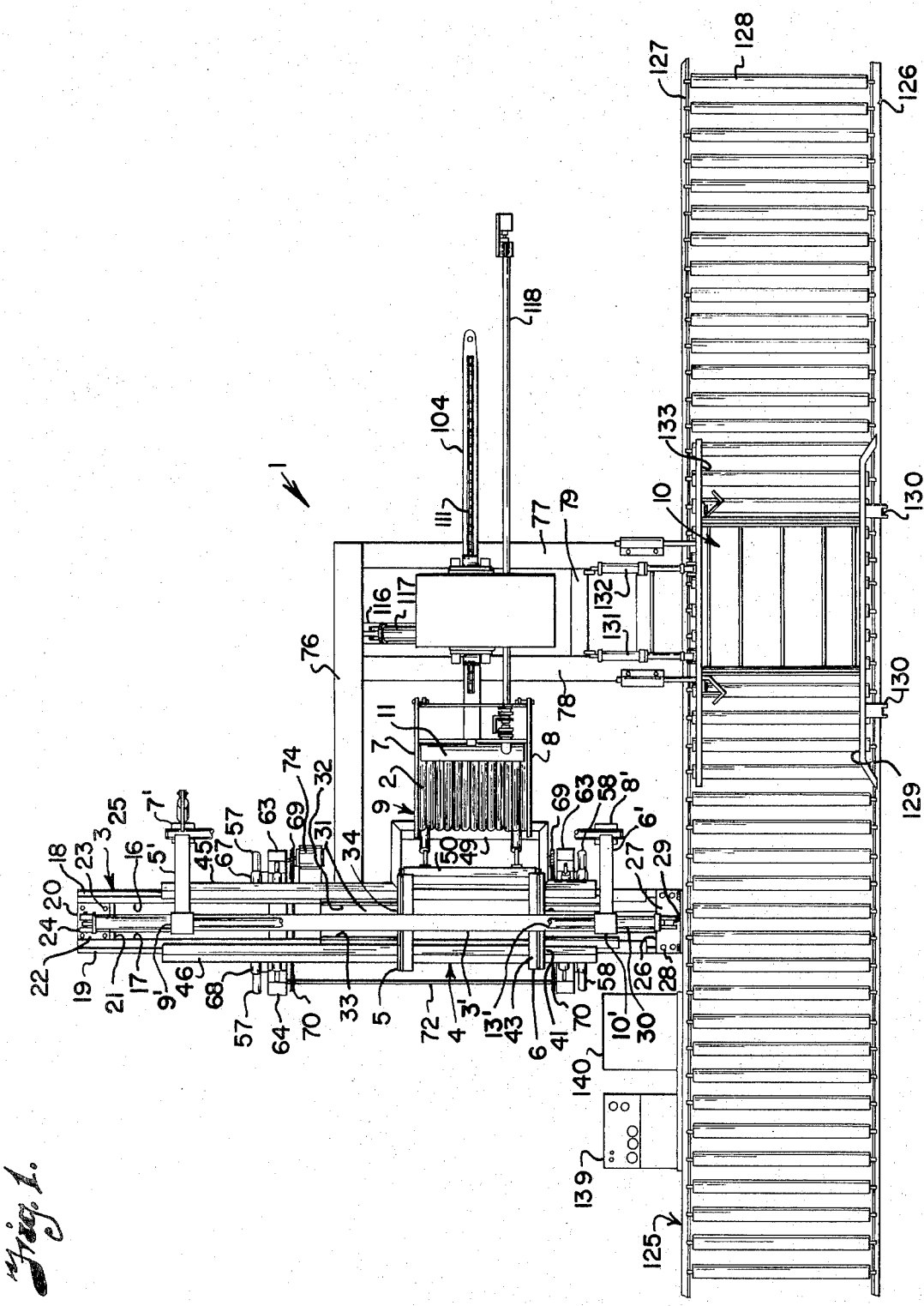
FIG. 1 is a plan view of an apparatus for compressing and handling a plurality of tires and embodying features of the present invention.

Referring more in detail to the drawings:

As required, detailed embodiments of the present invention are disclosed herein. However, it is to be understood that the disclosed embodiments are merely exemplary of the invention which may be embodied in various forms. Therefore, specific structural and functional details disclosed herein are not to be interpreted as limiting but merely as a basis for the claims and as a representative basis for teaching one skilled in the art to variously employ the present invention in virtually any appropriate detailed structure.

In the disclosed embodiment of the present invention, the reference numeral 1 generally designates an apparatus for preparing vehicle tires 2, such as pneumatic tires, for shipping and storage including compressing and handling a plurality of the tires 2 positioned in a group in side-by-side relation and preferably substantially coaxially aligned. The tire compressing and handling apparatus 1 includes a base structure 3 having tire receiving and support means 4 mounted thereon and adapted to receive and support a selected number of tires 2 in a side-by-side relation and between a pair of facing jaws or platens 5 and 6 which are operable to compress said tires 2 therebetween and to permit engagement of the tires 2 with respective spaced finger groups 7 and 8 of a hand assembly 9. The hand assembly is mounted for movement relative to the jaws 5 and 6 to receive and remove the tires from the support means 4. The hand assembly 9 is operable to position the compressed group in a selected position in a holder or shipping structure 10 as later described. The hand assembly 9 has an ejection member 11 therein which is relatively movable between a retracted position permitting the hand assembly 9 to receive the plurality of compressed tires 2 and an ejection position during withdrawal of the hand assembly 9 from a compressed group of tires 2 as when positioning same in a holder 10.

The illustrated base structure 3 is formed of a pair of laterally spaced longitudinal side members 12 each extending between and having respective opposite ends thereof suitably secured to transverse end members 13 and 14, as by welding, bolts, rivets, or the like. A plurality of longitudinally spaced transverse members 15 extend between and are received to the longitudinal member 12 to provide a substantially rigid structure.

Laterally spaced longitudinal beams 16 and 17 are secured to and supported on the base frame. Guide or support members 18 and 19 are suitably mounted on upper portions of the longitudinal beams 16 and 17 respectively, and secured thereto as by plurality of longitudinally spaced bolts. The guide or support members 18 and 19 each extend substantially the full length of the respective side beams 16 and 17 and form ways for a purpose later described.

A bracket 20, for a purpose later described, is positioned adjacent one end of the base structure 3 and is illustrated as including a generally horizontal spacer or support member 21 extending laterally or transversely between the longitudinal side beams 16 and 17 and suitably secured thereto, as by welding. The spacer or support member 21 preferably has a plurality of longitudinally and laterally spaced apertures therein.

A base plate 22 engages and is supported on the spacer or support member 21 and is longtudinally adjustable relative thereto. In the illustrated structure, the adjustment is by the base plate having a plurality of corresponding longitudinally and laterally spaced apertures therein with the apertures preferably being elongated in the longitudinal direction. The base plate 22 is connected to the spacer or support member 21 by a plurality of bolts 23 extending through respective apertures in the base plate 22 and the spacer or support member 21. The bracket 20 includes an upstanding standard 24 suitably secured to the base plate 22, as by welding, and extending upwardly therefrom. The standard 24 is adapted to have one end of an extensible member 25 pivotally connected thereto and the extensible member 25 is adapted to move one of the jaws, for example the jaw 5, longitudinally of the support structure 3.

The other or opposite end of the base structure 3 also has a bracket 26, for a purpose later described, mounted on the longitudinal side beams 16 and 17. The illustrated bracket 26 includes a base portion 27 having a plurality of longitudinally spaced slotted apertures positioned along each of the opposite edge portions thereof and each adapted to align with a respective one of suitable apertures through upper portions of the longitudinal side beams 16 and 17 to receive suitably fastening devices, such as bolts 28, for adjustably connecting the base portion 27 to said side beams. The illustrated bracket 26 includes a standard 29 suitably secured to the base portion 27, as by welding, and upstanding therefrom. The standard 29 is adapted to have one end of a second extensible member 30 pivotally connected thereto and the second extensible member 30 is adapted to move the other jaw 6 longitudinally of the base structure 3.

The facing jaws 5 and 6 are adapted to compress the tires 2 and one or both jaws may be movable, however, the jaws 5 and 6 are illustrated as being both movable toward and away from each other and each includes a suitable frame for stiffening the jaw portions. It is to be understood that the jaws may be mounted in any suitable manner and moved by any suitable operators, such as screws, rams, arms or the like to apply compressing movement and power. In the illustrated structure, the one jaw 5 is adjacent the brakcet 20 which is adjacent the one end of the base structure 3 and the one jaw 5 has a base portion 31 and a pair of laterally spaced bracing members 32 and 33 each extending upwardly from the base portion 31 and providing lateral support for a back plate 34 of the one jaw 5. The base portion 31 engages and is movable longitudinally along guide members or ways 18 and 19.

The illustrated jaw 5 has a plurality of vertically spaced laterally or transversely extending members 35 mounted on one surface of the back plate 34 to define a plurality of passages 36 in the one surface of the one jaw 5. Each of the passages 36 is adapted to receive therein a respective finger of one of the finger groups 7 and 8 of the hand assembly 9. The base portion 31 of the one jaw 5 has a suitable bracket 31' depending therefrom and adapted to pivotally receive an other end of the extensible member 25. The bracket 31' on the base portion 31 extends into the space between the side beams 16 and 17.

The extensible member 25 may be any suitable structure which is adapted to move the one jaw 5 longitudinally of the base structure 3. The extensible member 25 preferably has a plurality of telescoping sections or cylinders and is of the double acting type whereby the extensible member 25 is adapted to move the jaw 5 longitudinally along a substantial portion of the base structure 3 during compressing of the tires 2.

The other jaw 6 is illustrated as having a pair of spaced runners 37 and 38 adapted to engage the guide members or ways 18 and 19 respectively for movement longitudinally therealong. Bracing members 39 and 40 are suitably secured to and extend upwardly from the runners 37 and 38 respectively. The bracing members 39 and 40 are suitbly secured to a back plate 41 of the jaw 6 to provide support therefor. A bracket 42 is mounted on the back plate 41 and adapted to pivotally receive an other end of the extensible member 30.

The extensible member 30 may be any suitable structure adapted to move the jaw 6 longitudinally of the base structure 3 and toward the jaw 5. However, the extensible member 30 is illustrated as having a single acting cylinder whereby the jaw 6 has less movement longitudinally of the base structure 3 than the jaw 5 whereby the tires 2 may be positioned in side-by-side contact with the jaw 6 when said jaw 6 is in a retracted position.

The jaw 6 also has a plurality of vertically spaced laterally or transversely extending members 43 mounted on the back plate 41 to define a plurality of passages 44 in one surface of the jaw 6 and the passages 44 are each being adapted to receive a respective finger of the other finger group of the hand assembly 9.

It is desirable to provide means to retain the tires 2 in position between the jaws 5 and 6 during compressing the tires 2, therefore, the jaws 5 and 6 each have an upwardly open recess or notch in the upper edge thereof to receive a retainer member 3' therein. The retainer member 3' is moved into the recesses or notches prior to movement of the jaws 5 and 6 toward each other and the retainer member 3' is mvoed out of the recesses or notches during movement of the hand assembly 9 and tires 2 therein away from the support means 4. The retainer member 3' preferably is of substantially rigid construction and of sufficient length to permit substantial movement of the jaws 5 and 6 away from each other.

The tire receiving and support means 4 includes a plurality of laterally spaced longitudinally extending rails mounted on the base structure 3 and each engageable by respective peripheral portions of the tires 2. In the illustrated structure, a pair of rails 45 and 46 are positioned above the longitudinal side beams 16 and 17 respectively and each are elongated members preferably having one surface thereof tangent to the periphery of the tires 2.

In the illustrated structure, opposite ends of the retainer member 3' are each mounted on an end of arms 5' and 6' which each have the other end thereof pivotally mounted on posts 7' and 8' spaced from the support means 4. The retainer member 3' is preferably adjustable vertically to conform to the size of the tires 2 within the support means 4. Gear units 9' and 10' are mounted on the end of the arms 5' and 6' respectively and positioned above the retainer member 3'. Shafts 11' and 12' are operatively connected to, as by meshing gears (not shown), and depend from the gear units 9' and 10' respectively and have their lower ends supporting respective opposite ends of the retainer member 3'.

An elongated shaft 13' extends between the gear units 9' and 10' and has respective opposite end portions thereof operatively connected to the gear units 9' and 10', as by meshing gears (not shown), whereby selective rotation of the shaft 13' raises or lowers the retainer member 3'. At least one of the rails has a movable section therein and means connected thereto for moving the movable section between a tire supporting position and a retracted position allowing fingers of the hand assembly 9 to move thereby to receive the tires compressed between the jaws 5 and 6.

In the illustrated structure, one of the rails, for example rail 45, has a pair of arm portions 47 and 48 positioned intermediate the end thereof. The arm portions 47 and 48 extend outwardly and downwardly from upper portions of the rail 45 and a connection portion 49 extends between lower ends of the arm portions 47 and 48 thereby providing a substantially rigid structure for the one rail 45. A movable section 50 is positioned between and has opposite ends thereof positioned adjacent the arm portions 47 and 48 respectively and guide portions 51 and 52 are mounted on the respective opposite ends of the movable section 50. The guide portions 51 and 52 are slidingly engageable with the arm portions 47 and 48 respectively whereby the movable section 50 is movable along the arm portions 47 and 48 in response to operation of suitable extensible means, such as a pair of extensible members 53 and 54, each having one end thereof secured to the connecting portion 49 and an other end thereof secured to the movable section 50 whereby operation of the extensible members 53 and 54 moves the movable section 50 between a tire supporting position substantially aligned with upper portions of the rail 45 and a retracted position adjacent the connecting portion 49.

The apparatus will handle different size tires and the spacing between the rails 45 and 46 is adjusted for various tire sizes by moving same substantially radially relative to the tires to be supported thereon. The rails 45 and 46 shown have a pair of longitudinally spaced internally threaded sleeves 55 and 56 respectively and extending outwardly from the respective rails 45 and 46. The rails 45 and 46 also have a pair of guide shafts 57 and 58 respectively mounted adjacent the sleeves 55 and 56 respectively, for a purpose later described.

The rails 45 and 46 are movably supported on the transversely extending intermediate members 15 and in the illustrated structure, web portions 59 and 60 have respective edges thereof suitably secured to the respective intermediate member 15 and to a respective one of the side beams 16 and 17. Flange portions 61 and 62 are suitably secured to the web portions 59 and 60 respectively and are inclined at an angle with the horizontal. The upper surface of the flange portions 61 and 62 are each preferably substantially parallel with a respective radius of tires to be supported on the rails 45 and 46.

The movement of the rails may be by any suitable operators, such as rams, arms, jacks and the like. In the illustrated structure, gear housing 63 and 64 are suitably mounted on the flange portions 61 and 62 respectively and are operative to rotate threaded shafts 65 and 66 extending from the gear housings 63 and 64 respectively. The threaded shafts 65 and 66 are received in the threaded sleeves 55 and 56 extending from the rails 45 and 46 respectively whereby rotation of the threaded shafts 65 and 66 effects movement of the rails 45 and 46 relative to the base structure 3 and generally radially relative to the tires to be supported thereon.

It is preferred that the movement of the rails 45 and and 46 be confined to a defined path. Therefore, guide sleeves 67 and 68 are mounted on the flange portions 61 and 62 respectively and are positioned to receive the guide shafts 57 and 58 extending from the rails 45 and 46 respectively. The guide sleeves 67 and 68 are preferably substantially parallel with the flange portions 61 and 62, threaded shafts 65 and 66, and threaded sleeves 55 and 56 whereby movement of the rails 45 and 46 is generally radially relative to the tires to be supported on the rails 45 and 46.

In the illustrated structure, operation of the gear housings 63 and 64 are effected by suitable sprockets 69 and 70 respectively operatively connected thereto. The rails 45 and 46 each are moved in the same direction and at the same rate. An endless chain 71 engages and extends between the sprockets 69 and 70. The gear housing 63 and 74 supported on the tranvsersely extending intermediate members 15 operate at the same rate, therefore, a connecting shaft 72 is positioned on one side of the base structure 3 and in the illustrated embodiment, the shaft 72 extends between the sprockets 69 and is generally parallel with the side beam or member 16. The endless chain 71 preferably engages suitable idler sprockets 73 positioned below the side beams or members 16 and 17 to thereby permit movement of the jaws 5 and 6 toward and away from each other. The rails 45 and 46 are movable at a substantially uniform rate, a suitable drive motor 74 being operatively connected to the connecting shaft 72 whereby operation of the drive motor 74 effects radial movement of the rails 45 and 46 thereby adjusting same to support tires of a selected tire size or tire diameter.

The tire receiving and support means 4 provides means for receiving a plurality of the tires 2 and supporting same in side-by-side relation and substantially coaxially aligned and the means 4 provides means for coaxially compressing the supported and aligned tires. In using a support structure constructed as illustrated and described, the movable section 50 of the one rail 45 is positioned in a tire supporting position. The jaws 5 and 6 are each moved to a retracted or spaced apart positionn and the rails 45 and 46 are adjusted to a desired spacing and position corresponding to the size of the tires to be supported thereon and the tires 2 are positioned between the jaws 5 and 6 with the periphery thereof in supporting engagement with the rails 45 and 46. It is preferable that one end tire of the plurality of tires 2 be in engagement with the jaw 6 and the other tires placed in side-by-side engagement. The extensible members 25 and 30 are then operated to move the jaws 5 and 6 toward each other thereby compressing the tires 2 therebetween. The group of compressed tires 2 are then prepared to be moved from between the jaws 5 and 6 and placed in the pallet 11.

Means for holding the compressed plurality of tires 2 and for removing same from the means for supporting and compressing the plurality of tires includes the hand assembly 9 and means operatively connected thereto for moving same into and out of the space between the jaws 5 and 6 and for moving the hand assembly 9 to a position for placing the tires 2 into the holder while in a compressed condition.

In the illustrated embodiment, the hand assembly 9 is movably and rotatably supported on a base structure 74 which is positioned at a selected spacing from the base structure 3. A spacing member 76 has one end thereof suitably connected to at least one of the longitudinally side beams 16 and 17 of the base structure 3 and the other end thereof suitably connected to at least one of a pair of laterally spaced elongated side members 77 and 78 of the base structure 75. A plurality of longitudinally spaced transverse bracing members 79 extend between and are suitably connected to the side members 77 and 78, as by welding, bolts, or the like, to thereby provide a substantially rigid structure for supporting the hand assembly 9.

The hand assembly 9 is mounted on an upstanding standard or support portion 80 having a lower end 81 thereof rotatably supported on a base member 82 positioned within a suitable base housing 83 and extending between and suitably connected to the side members 77 and 78. The lower end 81 of the standard or support portion 80 extends through a lower bearing 84 mounted on the base member 82. An upper end portion 85 of the upstanding standard or support portion 80 is rotatably supported in an upper bearing 86 suitably mounted on an upper portion of the base housing 83.

A power means is operatively connected to the upstanding standard or support portion 80 to rotate same and the hand assembly 9 thereon. In the illustrated sturcture, a suitable drive motor 87 is preferably positioned within the base housing 83 and operative to rotate a suitable shaft 88 extending therefrom and having a suitable drive method. In the illustrated structure, the shaft 83 has a gear 89 on the end thereof. The upstanding standard or support portion 80 has a gear 90 suitably secured thereon and in engagement with the gear 89 driven by the drive motor 87 whereby operation of the drive motor 87 is operative to rotate the upstanding standard or support portion 80 and the hand assembly 9 mounted thereon.

In the illustrated structure, an upper housing 91 is secured to the upper end portion 85 of the upstanding standard or support portion 80 and includes a deck member 92 having a sleeve portion 93 depending therefrom and adapted to receive the upstanding standard or support portion 80 therein. The sleeve portion 93 is suitably secured to the upper end portion 85 of the upstanding standard or support portion 80, as by keying, whereby rotation of the standard or support portion 80 effects rotation or turning of the upper housing 91 and the hand assembly 9 between a tire receiving position and a tire depositing position.

The illustrated upper housing 91 includes a pair of end flanges 94 and 95 suitably secured to the deck member 92, as by bolts. The end flanges 94 and 95 each extend upwardly from the deck member 92 and each have a suitable aperture therein adapted to define respective races for suitable bearings 96 engageable with the end flanges 94 and 95 and with an exterior surface of a body member 97 which is preferably generally cylindrical to permit same to be rotated within the upper housing 91.

The body member 97 preferably has suitable bearing retainers 98 and 99 positioned adjacent the opposite ends thereof and on opposite sides of the bearings 96. The body member 97 has end flanges 100 and 101 suitably secured to opposite ends respectively thereof and adapted to support suitable roller support members 102 and 103 respectively.

The hand assembly 9 has an arm 104 extending thereform and preferably coaxially through the body member 97. The arm 104 may be any desired shape, however, the arm 104 is illustrated as having suitable non-round shpae, such as square, and is preferably tubular to coaxially receive therein a suitable intensible member, such as a hydraulic or pneumatic cylinder 105 which is operatively connected to the ejection member 11. The arm 104 is supported for axial or longitudinal motion relative to the body member 97 by suitable bearings which are illustrated as rollers 106 mounted on the roller support members 102 and 103.

Power means is operatively connected between the arm 104 and the body member 97 to effect movement of the arm 104 and the hand assembly 9 relative to the upper housing 91 during receiving and handling of the tires 2 which in a compressed condition. In the illustrated structure, a rib 107 extends from the body member 97 and is positioned adjacent a longitudinal slot 108 in the body member 97. A reversible drive motor 109 is mounted on the rib 107 and is operative to drive a sprocket 110 which is engaged by an elongated chain 111 having opposite ends thereof suitably secured relative to the arm 104 adjacent respective ends thereof. Idler means, such as sprockets 112 and 113, are rotatably mounted on the rib 107 and positioned on respective opposite sides of the sprocket 110 to thereby position the chain 111 adjacent an exterior surface of the arm 104. The chain 111 is preferably in engagement with the exterior surface of the arm 104 and one of the rollers 106 on each of the roller support members 102 and 103 has a center portion of reduced thickness to permit the chain 111 to pass through said roller.

The hand assembly 9 and the arm 104 are rotated or turned between a position adapted to receive the tires 2 from the tire receiving and support means 4 and a position for placing the tires in the holder or shipping structure 10. The rotation of the hand assembly 9 is accomplished by rotating the body member 97 about the axis of the arm 104 and extensible member 105. In the illustrated structure, a bracket 114 is mounted on the exterior surface of the body member 97 and extends therefrom. The bracket 114 is substantially normal to the longitudinal axis of the body member 97 and is positioend adjacent a transverse slot 115 in the body member 97.

A lateral support member 116 extends from the deck member 92 and pivotally supports one end of an extensible member 117 having the other end thereof pivotally connected to the bracket 114 whereby extension and retraction of the extensible member 117 is operative to turn or rotate the body member 97 on the bearings 96. The extensible member 117 has a portion thereof positioned within the transverse slot 115.

It is desirable to porivde a control member 118 which is substantially parallel with the arm 104 and has one end thereof connected to the ejection member 11. The control member 118 is supported on a suitable bracket 119 mounted on the body member 97 and positioned adjacent the bracket 114. The control member 118 is held in position during relative movement between the hand assembly 9 and the ejection member 11. A clamp cylinder 120 is mounted on the bracket 119 and has a shoe portion 121 which is movable into engagement with the control member 118 to prevent movement of the control member 118 relative to the clamp cylinder 120. Holding the control member 118 by means of clamp cylinder 120 and the shoe or brake portion 121 is effective to also hold the extensible member 105 during depositing the tires 2 in the holder or shipping structure 10, as later described.

A suitable conveyor 125 is positioned adjacent the base structure 3 and the base structure 75 supporting the hand assembly 9. The conveyor 125 is adapted to permit movement of holders or pallets 10 therealong and to position successive pallets or holders 10 adjacent the base structure 75 to receive the tires 2 from the hand assembly 9. The conveyor 125 may be any suitable structure, such as including laterally spaced side rails 126 and 127 having a plurality of longitudinally spaced rollers 128 extending therebetween. A holder guide 129 is positioned adjacent one of the side rails and supported on suitable brackets 130 extending upwardly therefrom.

Each holder or pallet 10 is held in a selected position relative to the hand assembly 9 during placing the tires 2 therein. A pair of extensible members 131 and 132 are mounted on the base structure 75 and preferably on the side members 77 and 78 respectively and the extensible members 131 and 132 each are connected to a clamp member 133 which is movable into engagement with one side of a holder or pallet 10 for holding the other side thereof in engagement with the holder guide 129.

The hand assembly 9 receives the compressed tires 2 and the arm 104 is moved to retract the hand assembly 9 from between the jaws 5 and 6. The extensible member 117 is then operated to turn the body member 97 and thereby the hand assembly 9 to a position having the tires 2 in a substantially vertical stack. During turning the hand assembly 9, the upstanding standard or support portion 80 is rotated to move the hand assembly from a position adjacent the base structure 3 to a position adjacent the conveyor 125 and a pallet or holder 10 supported thereon. The hand assembly 9 is moved into the pallet 10 and to a desired position therein. The clamp cylinder 120 is energized to move the shoe or brake portion 121 into engagement with the control member 118 for holding same and the extensible member 105 and ejection member 11 in a selected position and the drive motor 109 is then energized to effect relative movmenet between the ejection member 11 and the finger groups 7 and 8 of the hand assembly 9. The hand assembly 9 is retracted while the ejection member 11 remains in position thereby deposition the tires 2 into the pallet 10 where the tires are permitted to expand into engagement with a suitable pallet top 134. The extensible member 105 is energized to retract the ejection member 11 into the hand assembly 9.

The holder or tire shipping and storage structure 10 is adapted to maintain one or more stacks of tires in a compressed condition during shipping and storage and the illustrated holder 10 includes a base member 135 having a deck portion 136 supporting a plurality of spaced stacks of tires thereon and a plurality of standards 137 mounted on the deck portion 136 and extending upwardly therefrom to receive the top member 134 thereon in enegagement with top tires of the stacks and secure the top member 134 in selected spaced relation with the base member 135. The standards 137 each have at least one movable section 138 to permit adjusting the spacing between the base member 135 and the top member 134 and thereby adjusting compression on the stacks of tires. The holder 10 is easy to handle and is adapted to be stacked vertically in warehouses with like holders.

The holder 10 is adapted to receive the stacks of tires in different locations therein and hold the compressed tires in said stacks. Adjustment of the standards 137 permits positioning the top member 134 in a selected spaced relation with the deck portion 136 whereby there will be a minimum of expansion of the tires upon removal from the hand assembly 9. The preferable spacing between the top member 134 and the deck portion 136 is, therefore, only slightly greater than the spacing between exterior surfaces of the finger groups 7 and 8.

After the tires are compressed, the movable section 50 is lowered and the hand assembly 9 is moved to a position having the finger groups 7 and 8 received in the passages in facing surfaces of the jaws 5 and 6 which are then retracted to permit the tires to be gripped by the finger groups 7 and 8. The hand assembly 9 is then withdrawn from the tire receiving and support means 4. The upstanding support portion 80 is rotated through an angle selected to position the hand assembly 9 at a desired location within the holder or shipping structure 10. During rotation or turning of the upstanding support portion 80, the hand assembly 9 is turned by rotating the arm 104 through 90° to position the group of tires 2 in a vertical stack. After the selected rotation of the upstanding support portion 80 and rotation or turning of the arm 104, the arm 104 is extended a selected distance to position the hand assembly 9 in the desired location in the holder 10.

Hydraulic lines and electrical conductors have been omitted for clarity, however, all hydraulic operations including operation of the extensible members which move the jaws 5 and 6, raise and lower the movable section 50, rotate the body member 97, move the shoe portion 121, move the clamp member 133 into engagement with selected holders 10, and move the ejection member 11 are controlled from a hydraulic control center 139.

Operation of the various extensible members and drive motors is suitably programmed on tape for various time sequence of operation and duration of operation of drive motors thereby determining the distance the hand assembly 9 is retracted and extended and the angle through which the upstanding support portion 80 is turned. The various drive motors are stepping motors which are subject to precise control as to time duration of operation, as by solenoids responsive to signals from a control center 140.

It is to be understood that while I have illustrated and described one form of my invention, it is not to be limited to the specific form or arrangement of parts herein described and shown.

What I claim and desire to secure by Letters Patenet is:

1. In a tire packaging apparatus, the combination of means holding a plurality of tires in side-by-side relation; pressure means movably mounted relative to said holding means and operative to compress said plurality of tires to a selected compressed condition; an arm having gripping fingers movable into engagement with ends of said compressed tires to hold samd during release by the pressure means; a tire holder having a pallet and a retainer removably secured relative to said pallet and spaced therefrom a distance substantially corresponding to the distance between ends of said compressed tires; means operatively connected to said arm to move same and withdraw the fingers with tires gripped thereby from said holding means and position the tires in the tire holder with the fingers substantially engaging the pallet and retainer; and ejection means cooperating with the arm and fingers to deposit the tires in the tire holder in response to withdrawing of the fingers from engagement therewith and permit the pallet and retainer to engage and retain the tires in compressed condition.

2. A tire packaging apparatus as set forth in claim 1 and including:
   a. a conveyor operative to movably support tire holders and having a loading position for said holders; and
   b. stop members to said loading position and operative to selectively engage tire holders to retain same in position during loading and release same for movement on the conveyor when loaded.

3. A tire packaging apparatus as set forth in claim 1 wherein the means connected to said arm to move same includes:
   a. a base structure;
   b. an arm carrier;
   c. means on the base structure supporting the arm carrier for rotative movement to swing the arm relative to the base structure;
   d. means on the arm carrier movably supporting the arm for longitudinal movement of the arm relative to said arm carrier; and
   e. power means on the arm carrier and operatively connected to the arm for effecting longitudinal movmeent thereof and movement of said fingers into and out of engagement with said compressed tires.

4. A tire packaging apparatus as set forth in claim 3 wherein:
   a. said holding means supports the tires in axial alignment with the axis substantially horizontal;
   b. said holder has the retainer spaced above the pallet and is arranged to receive compressed tires with the axis substantially vertical; and
   c. means are mounted on said base structure for supporting the arm carrier for rotation on an axis that is longitudinally of said arm whereby the carrier is movable to swing the arm and to rotate the arm to move the fingers thereon between a tire receiving position and a tire deposit position.

5. A tire compressing and handling apparatus comprising:
   a. means receiving a plurality of tires and supporting same in side-by-side relation and substantially coaxially aligned;
   b. means adjacent said supporting means for coaxially compressing the supported and aligned tires;
   c. means movable into engagement with said compressed tires and operative to hold said tires and remove same from said supporting means; and
   d. means cooperating with said removing means and operative to place said plurality of ocmpressed tires in a holder which in compressed condition.

6. A tire compressing and handling apparatus as set forth in claim 5 wherein:
   a. said means for supporting a plurality of tires includes a plurality of laterally spaced longitudinally extending rails each engageable by respective peripheral portions of the tires; and
   b. said menas for compressing the supported tires comprises:
      1. a pair of facing jaws adjacent said rails and with at least one of said jaws being movable longitudinally of said rails, said jaws being spaced apart to permit the tires to be placed therebetween; and
      2. power means operatively connected to said one jaw for moving said toward the other jaw thereby compressing the plurality of tires therebetween.

7. A tire compressing and handling apparatus as set forth in claim 5 whererein:
   a. said means for compressing the plurality of tires includes a pair of jaws having surfaces in facing relation and means for moving same toward and away from each other;
   b. said facing jaws each have means thereof for defining a plurality of passages in the facing surfaces thereof;
   c. said means for holding the compressed plurality of tires comprises a hand assembly having a pair of spaced finger groups each having a plurality of fingers adapted to be received in respective passages in a respective one of said jaws; and
   d. said hand assembly has means connected thereto for selectively moving said hand assembly laterally toward and away from the path of said facing jaws thereby selectively moving said fingers into and removing same from said respective passages in the respective jaws.

8. A tire compressing and handling apparatus as set forth in claim 5 wherein:
   a. said means for compressing the supported tires includes:
      1. a pair of facing jaws with at least one of said jaws being movable longitudinally of said means for supporting a plurality of tires, said jaws being spaced apart to permit the tires to be placed therebetween; and
      2. extensible means connected to at least one of said jaws for moving said one jaw toward the other jaw thereby compressing the plurality of tires therebetween;
   b. said facing jaws each have means thereof for defining a plurality of spaced passages in the facing surfaces thereof; and c. said means for holding the compressed plurality of tires and removing same from said means for supporting and compressing the plurality of tires includes:
1. a base structure;
2. an upstanding support portion rotatably mounted on said base structure;
3. an arm mounted on and extending from said upstanding support portion;
4. a hand assembly on one end of said arm and having a pair of spaced finger groups each having a plurality of fingers, each of said fingers being adapted to be received in a respective one of the plurality of passages in a respective one of said jaws; and
5. means mounted on said upstanding portion and operatively connected to said arm for selectively moving said hand assembly laterally toward and away from said facing jaws thereby selectively moving said fingers into and removing said from said respective passages in the respective jaws.

9. A tire compressing and handling apparatus as set forth in claim 8 wherein:
a. said arm has means operatively connected thereto for rotating said hand assembly between a generally horizontal position of tire axes and a generally vertical position of tire axes;
b. said upstanding support portion has means operatively connected thereto for selectively rotating same and the arm mounted thereon; and
c. said hand assembly has an ejection member therein and means for effecting relative movement between said ejection member and said finger groups during ejecting the plurality of tires from said hand assembly.

10. A tire compressing and handling apparatus as set forth in claim 5 including:
a. means adjacent said means for placing the plurality of tires in a holder while in a compressed condition for movably supporting the holder; and
b. means positioning the holder in a selected position relative to said means for placing the plurality of tires in a holder and for holding said holder in the selected position.

11. A tire compressing and handling apparatus as set forth in claim 10 wherein said means for holding the plurality of compressed tires and for removing same and for placing same in a holder which in a compressed condition includes:
a. a base structure adjacent said means for compressing the supported tires;
b. an upstanding support portion rotatably mounted on said base structure;
c. an arm mounted on said upstanding portion;
d. a hand assembly on one end of said arm and having a pair of spaced finger groups, each of said finger groups having a plurality of fingers adapted to be engaged by respective end tires of the plurality of compressed tires;
e. means operatively connected to said upstanding support portion for selectively rotating same and said arm mounted thereon;
f. means mounted on said upstanding support portion and operatively connected to said arm for selectively moving said hand assembly toward and away from said means for compressing the supported tires;
g. means operatively connected to said arm for rotating same to selectively move said hand assembly between a generally horizontal position and a generally vertical position; and
h. an ejection member mounted within said hand assembly and movable relative to said finger groups of said hand assembly and between a retracted position and an ejection position during depositing the plurality of tires in a holder while in a compressed condition.

12. A tire compressing and handling apparatus as set forth in claim 5 wherein:
a. said means for receiving and supporting a plurality of tires includes a support structure and a plurality of laterally spaced longitudinally extending rails mounted thereon and each engageable by respective peripheral portions of the tires;
b. at least one of said rails has a movable section therein and means connected thereto for moving the movable section between a retracted position and a tire supporting position;
c. said means for compressing the supported tires comprises:
1. a pair of facing jaws adjacent said rails and having facing surfaces in spaced apart relation to permit the tires to be placed therebetween; and
2. means connected to said support structure and to each of said jaws for moving said jaws toward and away from each other whereby movement of said jaws toward each other effects compressing of the plurality of tires therebetween;
d. said facing jaws each have means thereon for defining a plurality of passages in the facing surfaces thereof;
e. said means for holding the compressed plurality of tires comprises a hand assembly having a pair of spaced finger groups each having a plurality of fingers with each of said fingers being adapted to be received in a respective one of the plurality of passages in a respective one of said jaws; and
f. said hand assembly has means connected thereto for selectively moving said hand assembly laterally toward and away from said facing jaws thereby selectively moving said fingers into and removing same from said respective passages in the respective jaws.

13. A tire compressing and handling apparatus as set forth in claim 12 wherein said means for holding the plurality of tires and for placing same in a holder while in a compressed condition includes:
a. a base structure adjacent said means for compressing the supported tires;
b. an upstanding support portion rotatably mounted on said base structure;
c. an arm mounted on said upstanding support portion and having said hand assembly mounted on one end thereof, said means for moving said hand assembly being mounted on said upstanding portion and operatively connected to said arm;
d. means operatively connected to said arm for rotating same to move said hand assembly between a generally horizontal position and a generally vertical position;
e. means operatively connected to said upstanding portion for selectively rotating same and said arm mounted thereon;

f. an ejection member movably mounted within said hand assembly; and g. means operatively connected to said ejection member for selectively effecting relative movement between said ejection member and said finger groups of said hand assembly and between a retracted position and an ejection position during depositing the plurality of tires in a holder while in a compressed condition.

14. A tire compressing and handling apparatus comprising:

a. a support structure having a plurality of laterally spaced longitudinally extending rails mounted thereon and each engageable by respective peripheral portions of a plurality of tires for supporting same in side-by-side relation and substantially coaxially aligned;

b. a pair of facing jaws adjacent said rails and having facing surfaces spaced apart to permit the tires to be placed therebetween;

c. means mounted on said support structure and connected to each of said jaws for selectively moving same toward and away from each other whereby movement of said jaws toward each other compresses the plurality of tires therebetween;

d. means on the facing surfaces of said facing jaws for defining a plurality of spaced passages in each of the facing surfaces;

e. a hand assembly having a pair of spaced finger groups each having a plurality of spaced fingers, each of said fingers being adapted to be received in a respective one of the plurality of passages in a respective one of said jaws and to be engaged by respective end tires of the plurality of tires when the jaws are moved away from each other;

f. means operatively connected to said hand assembly for moving same laterally toward and away from said facing jaws thereby moving said fingers into and removing same from said respective passages in the respective jaws; and g. means in said hand assembly and movable relative to said finger groups for ejecting the plurality of tires from said hand assembly and adapted to place the plurality of tires in a holder while in a compressed condition.

* * * * *